2,778,997
Patented Jan. 22, 1957

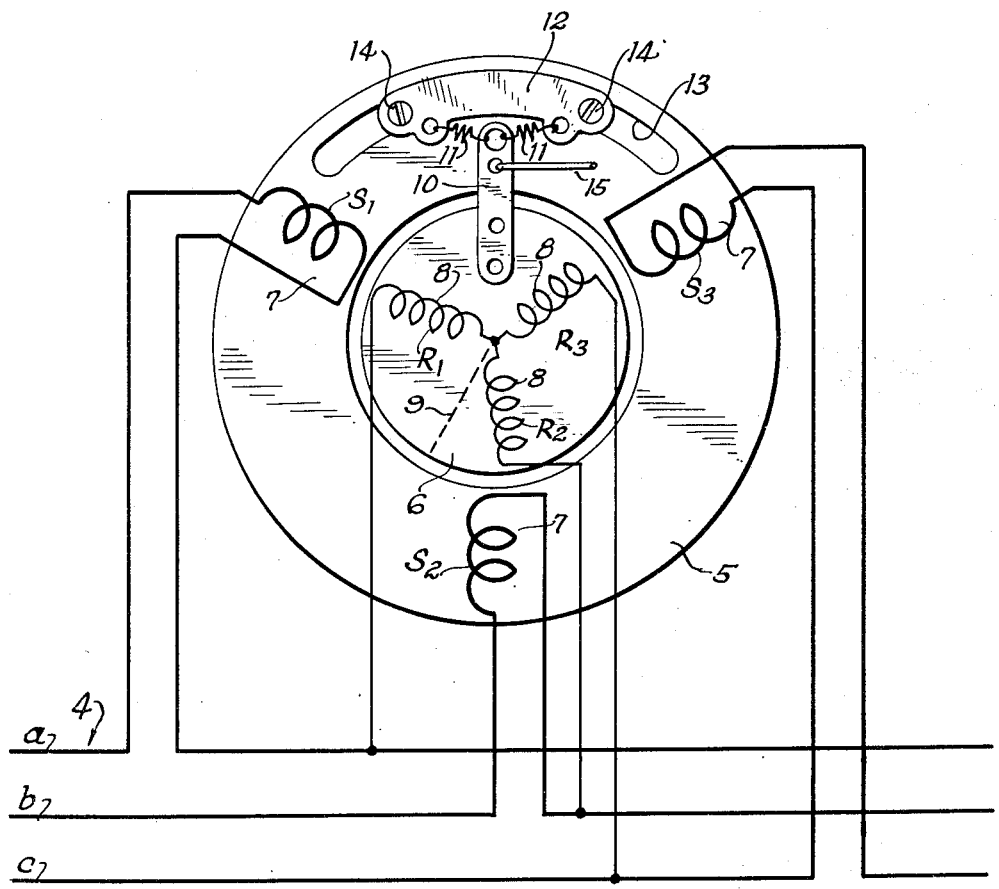

2,778,997
POLYPHASE HIGH TORQUE DYNAMIC WATTMETERS

Richard C. Cathcart, Chicago, Ill., assignor to Askania Regulator Company, Chicago, Ill., a corporation of Illinois Application December 26, 1950, Serial No. 202,764

6 Claims. (Cl. 324—107)

The present invention relates to dynamic wattmeters for measuring true power of polyphase alternating current circuits, by producing output torques varying in accurately linear proportion to variations in any or all of power factors, voltage amplitudes and current amplitudes of the respective phases of such a circuit, and having ranges of output torque magnitude suitable for practical purposes, such as actuation of the mechanically movable control element of a sensitive relay or power amplifier.

Heretofore it has been proposed to use as a high torque dynamic wattmeter, for measuring true power of a single load phase, a two-phase induction motor having two windings or winding sets which could respectively be energized by currents of amplitudes proportional to amplitudes of current and voltage of the load, and bearing to each other a phase relation displaced from the maximum torque-producing quadrature by a degree equal to degree of variance from phase agreement of the current and voltage of such load circuit. For phasing the winding currents in the relation necessary to wattmeter operation in an arrangement of this kind, phase-shifting reactances were arranged in one or both of the winding circuits.

It has also been proposed, for measuring true power of a three-phase circuit, to use a torque motor having three-phase stator and rotor winding systems that can be energized by three-phase currents proportional to amplitudes of currents and voltage of the various phases of a three-phase circuit. Such a motor arrangement is sensitive to power factors as well as amplitudes of currents and voltages of a load circuit to which its winding systems are connected as voltage and current winding systems, and with its rotor stalled by biasing means urging it to the position wherein unity power factor conditions of the load circuit phases so energize its windings as to produce maximum torque-developing interaction of magnetic fields. When such biasing means restrain degree of motor angular movement to a range wherein torque is proportional to amplitudes and phase of currents energizing them, the output rotor torque magnitude serves as an accurate measure of the magnitude of true power of the circuit to which the arrangement is connected. The present invention relates to a dynamic polyphase wattmeter of this general type. While it is disclosed as applied to three-phase practice, it obviously is not limited to this particular polyphase service.

Prior proposals to use three-phase motors with independently energizable stator and rotor winding systems for dynamic wattmeter service have been based on conventional perpendicular relative arrangements of corresponding magnetic axes of the stator and rotor windings for developing maximum torque when pairs of stator and rotor windings that correspond, in the sense of being energized from the same load circuit phase, are energized by currents that are in phase with line current and phase voltage respectively. For wattmeter service, however, since it is necessary to connect the voltage windings effectively across the phase lines and the current windings in series with the respective phase lines, the voltage winding circuits must have high impedances and the current winding circuits must have low impedances. Additionally, since the magnetic fields developed by the voltage windings must have certain intensities and must be generated from quite small currents, the voltage windings are of a relatively large number of turns of relatively fine wire, while the current windings are of relatively few turns of relatively heavy wire to minimize voltage drop across them. Thus, the voltage and current windings of a wattmeter torque motor inherently have widely different inductances.

In a winding having considerable inductance and relatively little resistance, the current will have a phase lag with respect to the applied voltage. Thus, under the condition of unity power factor loading the rotor and stator currents in corresponding windings of the wattmeter will be out of phase unless auxiliary phase shifting devices are employed to bring the currents into phase agreement. Such phase shifting is usually accomplished by connecting suitable resistors and/or reactors in the voltage circuits of wattmeters.

I have discovered that several auxiliary phase shifting reactance systems which produce apparently equivalent results in so far as phase correction is concerned have marked adverse effects on the inherent linearity of torque magnitude of the motor to the magnitude of true power in the circuit which energizes the motor. I have also discovered experimentally that in use of these systems the linearity was best when the impedance of the phase shifter and resistance of the voltage coils was made as small as possible. A polyphase circuit phase shifter can be made with a suitably tapped polyphase transformer, which can be used to shift the voltage phase any desired amount without adding appreciable series impedance. One transformer of this type employs a two pole polyphase stator as the primary and rotor as the secondary, so arranged that angular displacements of the rotor produce corresponding shifts in the phase of rotor voltage. I further discovered that the same principle may be applied to the wattmeter motor directly; since its rotor is excited by polyphase currents a mechanical rotation of the rotor with respect to the stator will produce the same result as that obtained by externally shifting the phase of the applied rotor voltage. Since the rotor of this motor may be oriented to any desired position, I have discovered a method of eliminating all auxiliary phase shifting equipment and have discovered that the conventional perpendicular orientation of corresponding coils is not a necessary condition for satisfactory operation, of a device of this kind for wattmeter purposes. Thus, a motor having the necessary stator and rotor winding arrangements for independent energization as wattmeter current and voltage windings, can be arranged to produce a maximum torque-developing interaction between stator and rotor windings that are energized from the same load circuit phase when the power factor of such phase is unity and the rotor winding currents are out of phase to the degree resulting from the phase shifting characteristics of the rotor winding circuits. Still further, I have discovered that the arrangement in question does not appreciably affect the inherently linear torque magnitude response of a motor of this kind to variations in any or all of power factors, voltage amplitudes or current amplitudes of the various phases of a circuit connected to such motor. Specifically, the motor arrangement in question resides in biasing the stator and rotor of the motor to a relative positional relation wherein the axes of the stator and rotor windings energized from the same ones of the different load circuit phases are angularly spaced to provide a maximum torque-developing interaction between the rotating fields developed by the rotor and stator in a load circuit system of unity power factor. In other words, in accordance with the invention, instead of biasing the stator and rotor to their relative positions wherein maximum torque would be produced by in-phase current energization of stator and rotor windings that are energized from a single circuit phase, the stator and rotor are relatively biased to a position wherein maximum torque is developed by stator and rotor currents that are out of phase to the degree resulting from the phase shift of the voltage winding-energizing currents relative to current winding-energizing current arising from the reactance of the voltage windings.

Possibly it is most simple to regard the relative positional arrangement of the stator and rotor, comprising an important aspect of the invention, as a variation from a conventional perpendicular relative positioning of corresponding coil axes to develop maximum torque when voltage and current winding currents are in-phase. Regarded in this way, the arrangement may be said to be a change in the angular relation of the axes of corresponding stator and rotor windings from that which produces maximum torque from in-phase winding currents of given amplitudes, such change being of a physical angle equal to the electrical angle of current phase shift of the rotor winding circuits resulting from the reactive impedances of the windings thereof and in a direction opposite to the electrical sense of such phase shift.

As in prior suggestions, discussed above, the relative angular positioning of the stator and rotor provided by the present invention may be accomplished by biasing means arranged to urge the stator and rotor to such angular relative positioning, and having such resistance to deflection of the rotor from such position as to restrict the range of such deflection to an angle of the order of two or three degrees, or more, if the order of accuracy required permits.

Additional to the primary and very important result of improvement of the response linearity of an instrument of the kind in question, compensation for shifting of voltage winding current from the phase of the rotor voltage by positioning of the stator and rotor, provides a very simple and readily accomplished method of adjustment of individual instrument units to compansate unavoidable variations from instrument to instrument, arising from such causes as necessary tolerances in electrical circuit components or in the magnetic characteristics of motor core structure. Such adjustments are not so readily made in mass-produced instruments arranged for compensation by rotor winding circuit impedance-compensating reactance elements.

In experimental development of wattmeters of three-phase torque motor types generally described above, I have discovered that connection of such motors for exertion of rotor torque in one direction results in appreciably better response linearity than connection for exertion of such torque in the opposite direction. Investigation of this phenomenon disclosed that the better response linearity occurs when the motor windings are so connected in the load circuit that the power-representing rotor torque is exerted in the direction opposite to that in which the motor exerts no-load torque, developed in induction motor fashion when only the voltage, rotor, windings are energized. This difference in linearity accompanying reversal of direction of power-representing torque exertion appears to be a universal characteristic of instruments of the kind in question, possibly arising from transformer coupling effects between the rotor and stator windings.

A primary object of the present invention is to provide in polyphase wattmeters of torque motor type a novel arrangement for developing maximum torque from a load phase condition of unity power factor from cooperative voltage and current windings without the use of phase correcting circuits to compensate for current phase shifting characteristics of these windings.

Another object is the provision in such an instrument of a novel arrangement rendering the torque response of the instrument sensitive to power factors of a polyphase load circuit phases without requiring currents energizing corresponding current and voltage windings to have a pre-determined phase relationship to the current and voltage of the load circuit phase from which such windings are energized.

Another object is the provision of such an arrangement that is capable of ready and simple adjustment to compensate variations in individual instruments having unavoidable individually varying characteristics, to make such instrument conform to a standard of characteristics, and without the use of external compensatory equipment or any parts additional to the biased motor itself.

Another object is the provision of a torque motor type of alternating current wattmeter arranged to exert in one direction torque representing power of a loaded power circuit, and to exert its no-load torque in the opposite direction, to take advantage of the discovery that the power-representing torque response characteristic is much more linear when exerted in the direction opposite to that in which no-load torque is exerted than when exerted in the same direction as the no-load torque.

Still another object is the provision of a novel arrangement of three-phase dynamic wattmeter of alternating current torque motor type.

An additional object is the provision of a novel alternating current torque motor dynamic wattmeter system having an exceptionally linear response characteristic.

The accompanying drawing is an extremely simplified schematic diagram of a polyphase high torque dynamic torque motor type of wattmeter arranged in accordance with the invention, showing an angular relation between stator and rotor windings of a typical instrument arranged in accordance with the invention, but from which considerable variation is necessary in the case of instruments having variously differing winding impedances.

Describing the drawings in detail, the torque motor therein shown is arranged in accordance with the invention for measurement of true power of a three-phase load circuit 4 having phase lines $a$, $b$, and $c$, by development of a rotor torque having a magnitude proportional to the algebraic sum of the true power magnitudes of the respective load circuit phases, such phase power magnitudes respectively being proportional to amplitudes of phase current, voltage and the cosine of the angle of phase displacement between current and voltage in such phases. The motor comprises a stator 5 and a rotor 6 that is mounted in some conventional fashion for rotative movement relative to the stator. The stator carries a system of windings 7, shown in very simplified form as three sets of windings, each of which comprises a single coil $S_1$, $S_2$, $S_3$, so arranged on the stator as to produce a rotating field when energized by three-phase current. The rotor carries a system of sets of windings respectively corresponding to the stator sets, also shown in very simplified form as three single coils $R_1$, $R_2$, $R_3$, also arranged to produce a rotating magnetic field when energized by three-phase current. As shown, pairs of the stator mounted windings 7 and rotor carried windings 8 are connected to the same phase lines of the load circuit 4, such pairs of windings being designated by similar subscripts. Such pairs of windings energized from the same load circuit phases, and arranged in similar sequences about the stator and rotor, are the ones herein referred to as "corresponding."

As suggested by the schematic representations of the windings 7, 8, the stator windings preferably are of a relatively few turns of relatively heavy wire and are connected as current windings by being coupled effectively in series in the respective load circuit phase lines, as by the direct series connection shown by the drawing. The rotor carried windings preferably comprise relatively large numbers of turns of relatively fine wire, to give them sufficiently high impedance to render series resistance unnecessary and to cause them to generate magnetic fields of substantial intensities from energizing currents of relatively small amplitudes, and such windings are coupled effectively across the respective phase lines of the load circuit, shown as being directly connected across such lines. The phase shifting characteristics of the voltage windings arising from the inductances of those windings, causes phase lag between the applied voltage and the resulting current, and, since inductances of the voltage coils are much greater than those of the current coils, the voltage coil currents will lag the rotor coil currents while the power factor of circuit 4 is unity.

It will be seen that, assuming a load circuit phase sequence of $a$, $b$, $c$, and with the single-coil winding sets shown, both the stator windings 7 and the rotor windings 8 will produce two-poled magnetic fields rotating clockwise at the same speed, but that, assuming unity power factor of the load circuit, and due to the inductive impedance of the rotor windings, the polar axis of the rotor field will lag the angular relation to the corresponding polar axis of the stator field that would be present were the rotor and stator winding systems energized by in-phase currents, by a degree determined by the current phase shifting characteristic of the voltage winding circuits. The primary aspect of the invention resides in the perception that the rotor and stator can be relatively positioned in such an angular relation with regard to the phase lag of the respective rotating field axes arising from rotor inductance as to accomplish the desired torque-developing phase relation of the rotor and stator fields, by a corrective spatial relative positioning of the fields that compensates their variance from a desired phase relation. In the arrangement shown, the angular relative positioning of the rotor and stator is such that the respective rotating two-pole magnetic fields are in phase quadrature, that is to say, so that a rotating magnetic pole of one field is displaced by a physical phase angle of ninety degrees from the corresponding pole of the other field. The particular optimum phase angle between respective field axes depends, of course, on the number of field poles, and, consequently, on the number of coils in each set of the different winding systems, in accordance with the known formula $$\frac{180}{N} = x$$

wherein N represents the number of magnetic poles of one winding set, and $x$ indicates the number of angular degrees spacing the axes of the coils to produce the optimum field phase relation when the stator and rotor corresponding winding sets are energized by in-phase currents. In the two-pole field arrangement disclosed, the rotor 6 is biased to such an angular position relative to stator 5, with regard to the inductances of the voltage windings, that the rotor field axis will physically lag or lead the stator field axis, depending on the particular construction and connection of the windings 7, 8, by a ninety degree phase angle when the power factor of load circuit 4 is unity, by biasing the stator and rotor to an angular positional relation wherein the axes of corresponding coils are displaced from ninety degree angular relation, in a physical sense opposite to the electrical sense of the phase shifting of the voltage winding currents relative to the current winding currents due to the rotor winding impedances, and to a degree corresponding to the electrical magnitude of such shift. Thus, the highly inductive winding $R_1$ may be regarded as having been shifted in advance with respect to field rotation, from a ninety degree relation to the corresponding stator winding $S_1$, indicated by dotted line 9 as lagging winding $S_1$, to a position compensating the lagging phase shift of the voltage winding circuit due to the inductance of the voltage winding 8, and assumed to be somewhat less than ninety degrees. Thus, an equation representing the angular relation of the corresponding stator and rotor windings, resulting from the positional relation to which the rotor and stator are biased is $$\frac{180}{N} - \ominus \cong y$$

wherein $\ominus$ represents the number of electrical degrees of phase shifting characteristics of the rotor windings resulting from their inductance, and $y$ represents the angular spacing between corresponding coils of corresponding winding sets of the respective winding systems in accordance with the invention.

Biasing of the rotor to the desirable angular relation with the stator can be accomplished in any satisfactory way, a suitable arrangement being schematically disclosed. This arrangement comprises a lever 10 secured to rotor 6 and projecting radially therefrom into overlying relation to a surface of stator 5. A pair of springs 11 have ends attached to lever 10, their other ends being secured on opposite sides of the lever to the stator structure, in such relation that the rotor is urged to a preselected angular positional relation to the stator, wherein its windings 8 have the requisite angular relation to the stator windings 7. To permit selection of the relative angular positions of stators and rotors of individual instruments, the positions of the spring ends attached to the stator structure may be adjustable, as by being attached to a plate 12 which is movable arcuately on stator 5 and concentrically with respect to the axis of rotor movement. An arcuate slot 13 in the stator structure for guiding movement of plate 12, and screws 14 serving to lock the plate in position by a clamping action may be used to provide such adjustment. Suitable output means, as a link 15 coupled to lever 10, may be used to transmit the rotor output torque to a point of utilization.

In case the current amplitudes of the load circuit with which a given instrument is to be used are outside the current rating range of the current windings of such instrument, standard transformers may be used for coupling the current windings effectively in series with the load circuit phase lines, and transformers similarly may be used to couple the voltage windings effectively across the circuit phases. Individual transformer characteristics can be compensated readily by adjustment of the instrument coupled through them.

From the foregoing, the construction and arrangements necessary to practice of the herein-disclosed invention will be apparent, and it is to be understood that many changes and variations of the specific disclosures may be made without departing from the invention as defined by the appended claims.

I claim:

1. In a dynamic polyphase torque motor wattmeter of the type including a stator, a rotor, and independently energizable polyphase stator and rotor winding systems each of which comprises plural sets of windings respectively corresponding to sets of windings of the other system, the respective sets of each system being energizable by different phases of polyphase current to produce a rotating magnetic field, and the windings of one of said systems having reactances effective to shift currents energizing them relative to currents energizing the windings of corresponding sets of the other system; means for proportioning magnitude of output torque of said rotor to true electrical power of a polyphase load circuit in and across the respective lines of which the corresponding winding sets of the different said systems respectively may be effectively coupled as wattmeter current and voltage windings, said means comprising a resilient mechanical system biasing said rotor and stator to a positional relation wherein corresponding magnetic axes of said corresponding winding sets are angularly related to develop maximum torque while the corresponding winding sets of the respective systems respectively are energized by currents having an out of phase relation corresponding to the current shifting effect of said winding reactances.

2. In a dynamic polyphase torque motor wattmeter of the type including a stator, a rotor, and independently energizable polyphase stator and rotor winding systems, each comprising sets of windings that correspond to sets of windings of the other, the respective sets of each system being energizable by the different phases of polyphase current to produce a rotating magnetic field, and the windings of one of said systems having inductances effective to shift currents energizing them relative to currents energizing the windings of the other system; means for proportioning magnitude of output torque of said rotor to true electrical power of a polyphase load circuit in and across the respective phase lines of which the corresponding sets of the different winding systems respectively may be effectively coupled as wattmeter current and voltage windings, said means comprising a spring system resiliently biasing said rotor and stator to a positional relation wherein corresponding magnetic axes of the windings of said corresponding sets are displaced, from a normal angular relation productive of maximum rotor torque by energization of the respective corresponding sets of the different systems by in-phase polyphase currents, in an angular direction and to a degree respectively opposite in sense and proportional to magnitude of the current-shifting effect of said winding inductances.

3. In a dynamic torque motor wattmeter of the type including a stator, a rotor, and energizable stator and rotor winding systems each comprising sets of windings that correspond to sets of windings of the other, the respective sets of each system being energizable by the different phases of polyphase current to produce a rotating magnetic field, and the windings of one of said systems having inductances effective to shift currents energizing them relative to currents energizing the windings of the corresponding sets of the other system; means for proportioning magnitude of output torque of said rotor to true electrical power of a polyphase load circuit in and across the respective phase lines of which the corresponding sets of the different winding systems may be effectively coupled as wattmeter current and voltage windings, said means comprising a spring system resiliently biasing said rotor and stator to a positional relation wherein corresponding magnetic axes of the corresponding winding sets of the respective systems are angularly related in accordance with the equation $$\frac{180}{N} - \ominus \cong y$$

wherein $y$ represents the number of angular degrees spacing said corresponding magnetic axes of the respective corresponding winding sets, N represents the number of poles of the magnetic fields produced by each said set, and $\ominus$ represents the number of electrical degrees of current phase shifting effect of said winding inductances.

4. A dynamic polyphase torque motor wattmeter of the type including a stator, a rotor, and independently energizable polyphase stator and rotor winding systems each comprising sets of windings that correspond to sets of windings of the other, the respective sets of each system being energizable by the different phases of polyphase current to produce a rotating magnetic field, and the windings of one of said systems having inductances effective to shift the phase of current energizing them relative to currents energizing the windings of corresponding sets of the other system; means for proportioning magnitude of output torque of said rotor to true electrical power of a polyphase load circuit in and across the respective phase lines of which the corresponding sets of the different winding systems respectively may be effectively coupled as wattmeter current and voltage windings, said means comprising a spring system resiliently biasing said rotor and stator to a positional relation wherein corresponding magnetic axes of the windings of said corresponding winding sets of the respective systems are angularly spaced by a number of angular degrees substantially equal to $$\frac{180}{N} - \ominus$$

wherein N represents the number of poles of the rotating field produced by each winding system and $\ominus$ represents the number of electrical degrees of current phase shift corresponding to said winding inductances.

5. A dynamic torque motor wattmeter comprising relatively rotatable stator and rotor structures, a polyphase winding system mounted on each of said structures and each of said systems comprising a plurality of winding sets respectively corresponding to winding sets of the other system, the sets of one of said systems comprising low inductance coil means of relatively few turns of relatively heavy wire and the sets of the other said system comprising high inductance coil means of relatively many turns of relatively fine wire and respectively corresponding to the said coil means of the corresponding sets of the other said system, and the coil means of each of the respective systems being angularly spaced about the structures on which they are mounted for producing a rotating magnetic field when the respective sets are energized by the different phases of polyphase current, and means biasing said rotor and stator to a positional relation wherein corresponding magnetic axes of said corresponding coil means of the respective winding systems are angularly related in accordance with the equation $$\frac{180}{N} - \ominus \cong y$$

wherein $y$ represents degrees of angular spacing of said axis, N represents the number of poles of the magnetic field produced by each said winding system, and $\ominus$ represents the number of electrical degrees of phase shift corresponding to the degree of shift of current relative to voltage effected by inductances of said high inductance windings.

6. The combination with a polyphase electrical load circuit, of stator and rotor structures, a system of low inductance windings of relatively few turns of relatively heavy wire mounted on one said structure and a system of high inductance windings of relatively many turns of relatively fine wire mounted on the other, each said winding system comprising plural sets of windings corresponding in number to the phases of said load circuit and respectively corresponding to the respective sets of the other system, and said winding systems being arranged to produce interacting torque-developing rotating magnetic fields when their corresponding winding sets are energized by currents of amplitudes respectively proportional to amplitudes of currents and voltages of the respective load circuit phases, spring means resiliently biasing said rotor and stator structures to an angular positional relation wherein corresponding magnetic axes of the corresponding winding sets are angularly displaced by a number of angular degrees substantially equal to $$\frac{180}{N} - \ominus$$

wherein N represents the number of poles of the respective winding sets and $\ominus$ represents the number of electrical degrees of difference in the phase shifting characteristics of the windings of the respective systems, circuit means coupling the respective said sets of low inductance windings effectively in the respective lines of said load circuit for energization in a preselected phase sequence, and circuit means coupling the respective corresponding sets of high inductance windings effectively across said phase lines for energization in phase sequence to develop rotor torque exerted in opposite directions respectively during energization of both said systems and during energization of only the system of high inductance windings.

References Cited in the file of this patent

UNITED STATES PATENTS

| | | |
|---|---|---|
| 660,804 | Schrottke | Oct. 30, 1900 |
| 1,529,777 | Evans | Mar. 17, 1925 |
| 1,571,812 | Smith | Feb. 2, 1926 |
| 1,599,562 | Evans | Sept. 14, 1926 |
| 1,649,851 | Paine | Nov. 22, 1927 |
| 1,773,633 | Schigyo | Aug. 19, 1930 |
| 2,205,228 | Smith | June 18, 1940 |
| 2,396,538 | Schmied | Mar. 12, 1946 |